United States Patent
Po et al.

(10) Patent No.: US 7,388,052 B2
(45) Date of Patent: Jun. 17, 2008

(54) PROCESS FOR THE PREPARATION OF BLOCK COPOLYMERS

(75) Inventors: Riccardo Po, Leghorn (IT); Nicoletta Cardi, Arona-Novara (IT); Giuliana Schimperna, Novara (IT); Aldo Longo, Mantova (IT); Maria Caldararo, Trecate-Navara (IT)

(73) Assignee: Polimeri Europa S.p.A., Brindisi (IT)

( * ) Notice: Subject to any disclaimer, the term of this patent is extended or adjusted under 35 U.S.C. 154(b) by 473 days.

(21) Appl. No.: 10/518,550

(22) PCT Filed: Jun. 26, 2003

(86) PCT No.: PCT/EP03/06837

§ 371 (c)(1),
(2), (4) Date: Jan. 3, 2005

(87) PCT Pub. No.: WO2004/005361

PCT Pub. Date: Jan. 15, 2004

(65) Prior Publication Data
US 2007/0219329 A1    Sep. 20, 2007

(30) Foreign Application Priority Data
Jul. 9, 2002    (IT) ................... MI2002A1495

(51) Int. Cl.
*C08F 293/00*  (2006.01)
*C08F 4/04*    (2006.01)
*C08F 4/32*    (2006.01)

(52) U.S. Cl. ............. 525/256; 525/267; 525/273; 525/299; 526/204

(58) Field of Classification Search ........... 525/256, 525/273, 267, 299; 526/204
See application file for complete search history.

(56) References Cited

U.S. PATENT DOCUMENTS

| 6,239,226 | B1 * | 5/2001 | Fischer et al. ............ 525/256 |
| 6,353,065 | B1 | 3/2002 | Charleux et al. |
| 6,369,162 | B1 | 4/2002 | Visger et al. |
| 2002/0010267 | A1 * | 1/2002 | Klaerner et al. ........... 525/91 |

FOREIGN PATENT DOCUMENTS

| CA | 2422058 | * | 3/2002 |
| EP | 0 869 137 | | 10/1998 |
| EP | 0 887 362 | | 12/1998 |

OTHER PUBLICATIONS

U.S. Appl. No. 10/518,550, filed Jan. 3, 2005, Po, et al.
U.S. Appl. No. 08/644,578, filed May 10, 1996, Occhiello, et al.

* cited by examiner

*Primary Examiner*—Fred M Teskin
(74) *Attorney, Agent, or Firm*—Oblon, Spivak, McClelland, Maier & Neustadt, P.C.

(57) ABSTRACT

Process for the preparation of block copolymers, based on vinylaromatic monomers and monomers deriving from (meth)acrylic acid by means of radicalic polymerization which comprises polymerizing the monomers at a temperature higher than or equal to 120° C., in the presence of a radicalic initiating system comprising a compound having general Formula (I)

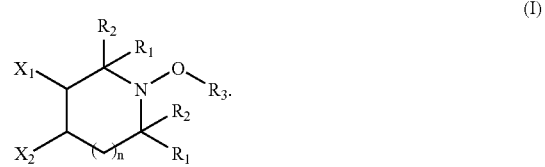

(I)

17 Claims, No Drawings

PROCESS FOR THE PREPARATION OF BLOCK COPOLYMERS

The present invention relates to a process for the preparation of block copolymers.

More specifically, the present invention relates to a process for the preparation of block copolymers based on vinylaromatic monomers and monomers deriving from (meth) acrylic acid.

Even more specifically, the present invention relates to a process for the preparation of block copolymers based on styrene and/or α-methylstyrene and acrylonitrile.

As it is known, the classical method for obtaining block copolymers comprises the use of anionic polymerization. This however has various drawbacks such as the accurate and onerous purification of the monomers from traces of impurities or humidity. In addition to this, not all polar monomers can be anionically polymerized with good yields and acceptable reaction conditions due to their interaction with the initiating system. Acrylonitrile is an example thereof.

Works have appeared in literature, in the last few years, in which block copolymers are synthesized by means of "live" radicalic polymerization, a more ductile technique with respect to the previous one and which does not require an excessive purity of the monomers.

Examples of scientific literature which describe radicalic polymerization are "Makromolecular Chemistry, Rapid Communication", 1982, 127 which describes the use of interfers which behave like thermal and/or photochemical initiators as well as chain transferors and terminators; "Makromolecular Chemistry", 1983, 184, 745, which describes tetra-arylethanes which thermally decompose to give diphenylalkyl radicals. These products are another example of initiators capable of giving live radicalic polymerization; Journal of Polymer Science, Polymer Chemistry Ed., 1986, 24, 1251 which describes live radicalic polymerization through silylated pinacols which behave analogously to the tetra-arylethanes mentioned above.

Other examples of scientific literature which describe live radicalic polymerization are represented by European patent 135,280, international patent application WO 96/30421 and U.S. Pat. No. 4,581,429.

A negative characteristic of live radicalic polymerization is that in the preparation of block copolymers, it is necessary to effect the synthesis and isolation of the first block, followed by dissolution of the macromolecule thus obtained in the second monomer, or mixture of monomers, which, after polymerization, forms the second block.

This technique not only has the technical disadvantages of having to handle two distinct polymerizations, which require the use of two polymerization reactors in series, but also gives rise to an end-product which may necessitate subsequent purification steps to eliminate the more or less sensitive traces of homopolymer, or random copolymer when operating in the presence of a mixture of monomers, which are inevitably formed during the second polymerization phase.

Another known drawback, which is quite important for allowing the products to be advantageously used, relates to the production of generally yellow-coloured polymers (as a result of degradation). To overcome this problem, WO 01/38431 suggests the mixing of reducing agents, such as phosphites, with the polymer in question, or antioxidants (alkylated monophenols, hydroquinones, triazines, benzylphosphonates, ascorbic acid, aminic antioxidants, etc.) or UV stabilizers, hydroxylamines or nitrons. The stabilizing agent can be added to the polymer in the molten state, if crystalline, or to the polymer heated to above the Tg value, if amorphous.

Object of the present invention is therefore to provide a process for the preparation of block copolymers, by means of radicalic polymerization, which does not have the disadvantages of the known art.

More specifically, the objective of the present invention is to provide a process for the preparation of block copolymers by means of radicalic polymerization, which allows a product to be obtained, containing a reduced quantity of homopolymer, or random copolymer, in addition to having the advantage of eliminating the onerous precipitation and recovery phase of the first polymeric block.

The Applicant has now found that these objectives can be achieved by the effective and economic preparation of block copolymers based on vinylaromatic monomers, such as styrene or α-methylstyrene, and monomers deriving from (meth)acrylic acid, for example (meth)acrylonitrile, consisting of at least two blocks: the first containing vinylaromatic units only, the second containing (meth)acrylic or vinylaromatic and copolymerized (meth)acrylic units.

The object of the present invention therefore relates to a process for the preparation of block copolymers by means of radicalic polymerization which comprises:

a) polymerizing a vinylaromatic monomer at a temperature higher than or equal to 120° C. in the presence of a radicalic initiating system comprising a compound having general formula (I):

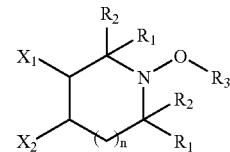

wherein $R_1$ and $R_2$, the same or different, represent a methyl or ethyl radical, $X_1$ represents a hydrogen atom, $X_2$ represents a hydrogen atom or a hydroxyl or $X_1$ and $X_2$, the same or different, represent a $C_1$-$C_4$ (iso)alkyl radical, or, they jointly form an aromatic ring, n is equal to zero or 1 and $R_3$ represents a radical selected from one of the following groups:

—$C(CH_3)_2$—CN;

—$C(CH_3)_2$—Ph;

—$CHCH_3Ph$;

or $R_3$ is absent, as in that position there is an un-coupled electron;

until a conversion of the monomer ranging from 5 to 99.9%, preferably from 8 to 95%, is reached;

b) feeding to the polymerization mixture of step (a), after obtaining the desired conversion, a monomer deriving from (meth)acrylic acid in such a quantity that, at the end of the polymerization, the total weight of the block copolymer Mw is lower than 1,000,000, operating at the same temperature and in the presence of the same initiating system;

c) recovering, at the end of the polymerization, the block copolymer thus obtained.

According to the present invention, the case wherein $R_3$ in the product having general formula (I) is absent, as in that position there remains an uncoupled electron, corresponds to stable radicalic compounds known as "nitroxides" or "nitroxylic radicals", as described in J. March, Advanced Organic Chemistry, Fourth Edition, pages 187-191.

The term "vinylaromatic monomer", as used in the present description and claims, essentially refers to a product which corresponds to the following general formula (II):

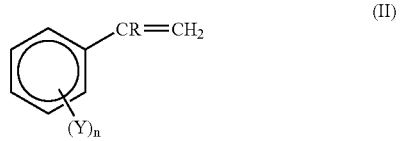

wherein R is a hydrogen atom or a methyl group, n is zero or an integer ranging from 1 to 5 and Y is a halogen, such as chlorine or bromine, or an alkyl or alkoxyl radical having from 1 to 4 carbon atoms.

Examples of vinylaromatic monomers having the general formula defined above are: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, etc. Styrene and α-methylstyrene are the preferred vinylaromatic monomers.

Any monomer deriving from (meth)acrylic acid can be used in the process for the preparation of block copolymers object of the present invention even if acrylonitrile and methacrylonitrile are preferred. Other monomers deriving from (meth)acrylic acid are alkyl esters in which the alkyl group contains from 1 to 4 carbon atoms, such as methyl acrylate, methyl methacrylate, ethyl acrylate, butyl acrylate, etc.

The polymerization of both step (a) and step (b) is carried out at a temperature higher than 120° C., preferably between 120 and 150° C., in the presence of the initiator having general formula (I). The latter is present in such concentrations as to activate the polymerization reaction and prolong it until the desired molecular weight Mw is obtained. Typical concentrations range from 0.01 to 2% in moles with respect to the total moles of monomers fed.

In order to favour the polymerization reaction, the initiator having general formula (I) can be used in a mixture with radical generating compounds (G) such as peroxides, hydroperoxides, peresters, percarbonates, azobisdialkyldinitriles, etc., with molar ratios I/G lower than 4. In particular, the initiator having general formula (I) can be used with free radical generators (G) such as dibenzoyl peroxide, dicumyl peroxide, N,N'-azobis(diisobutyronitrile) with molar ratios I/G ranging from 1 to 3. The initiator (I) can also be generated "in situ" starting from the corresponding nitroxyl radical. Examples of initiators having general formula (I) are:

2-methyl-2-(2,2,6,6-tetramethylpiperidin-1-yloxy)propionitrile;
2-methyl-2-(4-hydroxy-2,2,6,6-tetramethylpiperidin-1-yloxy)propionitrile;
N-(2-phenylethoxy)-2,2,6,6-tetramethylpiperidine;
N-(2-phenylethoxy)-4-hydroxy-2,2,6,6-tetramethylpiperidine;
N-(2-phenylprop-2-oxy)-2,2,6,6-tetramethylpiperidine;
N-(2-phenylprop-2-oxy)-4-hydroxy-2,2,6,6-tetramethylpiperidine;
1,1,3,3-tetraethyl-2-(2-cyanoprop-2-yl)-2,3-dihydro-1H-isoindole;
1,1,3,3-tetraethyl-2-(2-phenylprop-2-yl)-2,3-dihydro-1H-isoindole;
1,1,3,3-tetraethyl-2-(2-phenylethyl)-2,3-dihydro-1H-isoindole;
1,1,3,3-tetramethyl-2-(2-cyanoprop-2-yl)-2,3-dihydro-1H-isoindole;
1,1,3,3-tetramethyl-2-(2-phenylprop-2-yl)-2,3-dihydro-1H-isoindole;
1,1,3,3-tetramethyl-2-(2-phenylethyl)-2,3-dihydro-1H-isoindole.

After obtaining the polymerization of the first vinylaromatic polymeric block, the present process comprises feeding the second monomer in the quantities specified above. During this phase, the acrylic monomer is mixed with the non-polymerized vinylaromatic monomer, if present, and the polymerization is continued in the presence of the same initiating system.

The polymerization of both steps can be carried out batchwise, in continuous or semi-continuous at a temperature higher than 120° C. and at such a pressure as to maintain the monomers in liquid phase. Furthermore the polymerization can take place in the presence of an organic solvent, in suspension or in mass.

In the batch process the initiating system is added to the vinylaromatic monomer either pure or in the form of a solution or suspension in the quantities specified above. The reaction is continued at the desired temperature for a time ranging from 15 minutes to 24 hours. When the desired conversion has been reached, the second monomer is added and the polymerization is completed. At the end the block copolymer thus produced is recovered.

In the continuous process, the vinylaromatic monomer, initiating system and, optionally, the solvent, are fed in continuous to a polymerization reactor at such a flow-rate as to provide residence times suitable for reaching conversions ranging from 5 to 99.9%. The reaction product is then fed to a second reactor together with the acrylic monomer with such flow-rates as to guarantee the desired end-composition of the block copolymer. The reaction mixture is treated, at the outlet of this second reactor, for the recovery of the product.

Optionally, but not necessarily, the initiating system can be slowly added during the whole duration of the reaction or part of it. One of the two monomers, or both, can also be dosed in portions in subsequent times in order to vary the microstructure of the second block, as desired. At the end, the polymer is isolated from the polymerization mixture with one of the methods known in the art, for example by precipitation with a suitable non-solvent or by distillation and removal of the residues under vacuum at a high temperature.

At the end of the process, object of the present invention, extremely pure block copolymers are obtained, in a quantity greater than 50% by weight of the total product. The molecular weight Mw of each of the blocks can range from 1,000 to 500,000, preferably from 5,000 to 200,000 whereas the total molecular weight Mw of the polymer can vary from 10,000 to 1,000,000, preferably from 20,000 to 500,000.

The polymeric block of step (b) can contain a fraction of vinylaromatic units ranging from 30 to 90% by weight, preferably from 55 to 85%.

When, in the radicalic initiating system having general formula (I), $X_1$ and $X_2$, jointly form an aromatic ring, and n is equal to zero, products are obtained which are totally free of colouring. These products therefore do not need to undergo treatment downstream in order to eliminate the yellow colouring which, as described in the known art, is characteristic of the polymers synthesized with this method, thus considerably simplifying the production process of the polymer. Specific examples of these initiators are:

1,1,3,3-tetraethyl-2-(2-cyanoprop-2-yl)-2,3-dihydro-1H-isoindole;
1,1,3,3-tetraethyl-2-(2-phenylprop-2-yl)-2,3-dihydro-1H-isoindole;
1,1,3,3-tetraethyl-2-(2-phenylethyl)-2,3-dihydro-1H-isoindole;
1,1,3,3-tetramethyl-2-(2-cyanoprop-2-yl)-2,3-dihydro-1H-isoindole;
1,1,3,3-tetramethyl-2-(2-phenylprop-2-yl)-2,3-dihydro-1H-isoindole;
1,1,3,3-tetramethyl-2-(2-phenylethyl)-2,3-dihydro-1H-isoindole.

Some illustrative but non-limiting examples are provided for a better understanding of the present invention and for its embodiment.

EXAMPLE 1

920 g of styrene were charged, under an environment of nitrogen and at room temperature (20° C.), into a two litre steel autoclave, resistant to a pressure of 20 bars, equipped with an anchor stirrer and plunged pipe for sampling under pressure, jacketed and thermostat-regulated with siliconic oil circulation. The temperature was increased to 60° C., under pumping of nitrogen and with stirring at 100 revs per minute, and 2.28 g (7.06 mmoles) of benzoyl peroxide were added (as such, stabilized with 25.1% of water) and 1.24 g (7.95 mmoles) of 2,2,6,6-tetramethylpiperidinyloxyl radical (TEMPO) dissolved in 80 g of styrene.

The autoclave was then closed and brought to a pressure of 2 bars with nitrogen. The reaction temperature was increased to 130° C. in 25 minutes. When the temperature of 130° C. had been reached, an 85 g sample of reaction mixture was removed through a plunged pipe equipped with a valve. The same sampling was repeated every 30 minutes until the end of the test and the conversion was gravimetrically measured on each sample. 1 hour and 30 minutes after reaching 130° C. (34% conversion), 132 g of acrylonitrile were introduced with a pump, over a period of 10 minutes (so that the residual styrene/acrylonitrile mixture corresponds to the composition of the azeotropic mixture). 3 hours after reaching 130° C., the reaction mixture (containing 59% of polymer) was discharged under nitrogen pressure into 0.33 litre glass bottles (810 bottles each containing about 50 g of reaction mixture).

In order to separate the copolymer contained in the reaction mixture, 10 bottles were subsequently immersed in a thermostatic bath containing silicon oil, connected to a vacuum pump and the residual pressure was brought to 10 mbar. The temperature of the thermostatic bath was increased to 220° C. in 1.5 hours and was cooled 30 minutes after reaching the temperature of 220° C.

Once the pressure had been brought back to atmospheric value, the bottles were broken, at room temperature, the copolymer was extracted and ground in a mill. In order to estimate the yield to block copolymer, the end-copolymer was subsequently dissolved in cyclohexane (solvent for polystyrene) and in acetone (solvent for SAN) and 56% of an insoluble polymer was obtained which, upon GPC analysis, proved to have an Mw=102,000 and Mw/Mn=1.18.

COMPARATIVE EXAMPLE 1

20 ml (175 mmoles) of styrene, 30 mg (0.124 mmoles) of benzoyl peroxide and 26 mg (0.166 mmoles) of 2,2,6,6-tetramethylpiperidinyloxyl radical, were charged into a 100 ml rector, equipped with a magnetic stirrer. The reactor was immersed in an oil bath at 125° C. and the reaction was continued for 5 h.

A quantity of EtOH useful for the precipitation of polystyrene, was added to the solution, after cooling. The product is then filtered and dried in a vacuum oven (30 torr) for 8 h. A purification of the sample is effected by dissolution in methylene chloride.

1.5 g of the PS prepared as described above, dissolved in 14.2 ml (124 mmoles) of styrene and 5 ml (76 mmoles) of acrylonitrile (corresponding to the composition of the azeotropic mixture), are charged into a 100 ml reactor with magnetic stirring.

The reactor is heated, in an oil bath, to a temperature of 125° C. for 70 minutes. The mixture, after cooling, is treated with 100 ml of EtOH. The product is filtered and dried in a vacuum oven (30 torr) at 60° C. for 8 h. The conversion is 48.1%.

In order to estimate the yield to block copolymer, the end-copolymer was subsequently dissolved in cyclohexane (solvent for polystyrene) and in acetone (solvent for SAN) and 25% of an insoluble polymer was obtained, which upon GPC analysis proved to have an Mw=338,000 and Mw/Mn=1.78.

COMPARATIVE EXAMPLE 2

The procedure adopted in Comparative example 1 is repeated except for the fact that the first synthesis step lasted 1.5 h, the second step 1.5 h and the temperature was 130° C. in both steps.

Mw=360,000; Mw/Mn=1.83; PS/SAN=20%.

EXAMPLE 2

The procedure of Example 1 was repeated, adding acrylonitrile after 30 minutes instead of an hour and thirty minutes. The product has the following characteristics:

Mw=71,000; Mw/Mn=1.17; PS/SAN=64%.

EXAMPLE 3

The procedure of Example 1 was repeated, adding acrylonitrile after two hours and thirty minutes. The product had the following characteristics:

Mw=136,000; Mw/Mn=1.29; PS/SAN=52%.

EXAMPLE 4

The procedure of Example 1 was repeated, adding acrylonitrile and reacting for three hours instead of an hour and thirty minutes. The product had the following characteristics:

Mw=153,000; Mw/Mn=1.21; PS/SAN=51%.

EXAMPLE 5

Example 1 was repeated, using 7.95 mmoles of 2-methyl-2-(2,2,6,6-tetramethylpiperidin-1-yloxy)propionitrile in substitution of TEMPO and benzoyl peroxide.

The fraction of block polymer in the final reaction mixture is equal to 79%

Mw=125,000, Mw/Mn=1.31.

EXAMPLE 6

250 g of styrene containing in solution 400 mg of 1,1,3,3-tetraethyl-2-(2-cyanoprop-2-yl)-2,3-dihydro-1H-isoindole, previously treated by bubbling nitrogen for 15 minutes, were charged, at room temperature, into a 600 ml steel autoclave, equipped with an anchor stirrer, electrically heated jacket, internal cooling coil, feeding system and discharge from the bottom.

The reaction mixture is heated to 120° C. in 50 minutes (hour "0" when 118° C. is reached). 4 hours after hour "0", 51.3 g of acrylonitrile are added. The temperature is maintained at 120° C. for 1.5 hours, then the reaction mixture is cooled. 50 g of mixture are removed for analysis. The rest of the mixture is devolatilized at 14 mbar and heating to 230° C. in 2 hours, these conditions being maintained for 30 minutes. At the end the product recovered is cooled and granulated.

A perfectly colourless polymer is obtained, with the following characteristics: fraction of block polymer-in the end-product: 86%; Mw=115,000; Mw/Mn=1.35.

The invention claimed is:

1. A process for the preparation of a block copolymer by means of radicalic polymerization, which comprises:
   a) polymerizing a vinylaromatic monomer at a temperature higher than, or equal to, 120° C., in the presence of a radicalic initiating system, consisting of a compound having general formula (I):

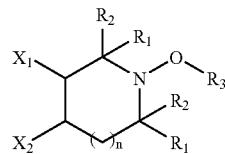

wherein $R_1$ and $R_2$, the same or different, represent a methyl or ethyl radical, $X_1$ represents a hydrogen atom, $X_2$ represents a hydrogen atom or a hydroxyl, or $X_1$ and $X_2$, the same or different, represent a $C_1$-$C_4$ (iso)alkyl radical, or, they jointly form an aromatic ring, n is equal to zero or 1, and $R_3$ represents a radical selected from the group consisting of
   —$C(CH_3)_2$—CN,
   —$C(CH_3)_2$—Ph, and
   —$CHCH_3$Ph;
   in a mixture with radical generator compounds (G) selected from the group consisting of peroxides, peresters, percarbonates, and azobisdialkyldinitriles, and with molar ratios I/G lower than 4;
   until a conversion of the monomer ranging from 5 to 99.9% is obtained;
   b) feeding to the polymerization mixture of step (a), after obtaining the desired conversion, methacrylonitrile in such a quantity that, at the end of the polymerization, the total weight of the block copolymer, Mw, is lower than 1,000,000, wherein step b) is carried out at the same operating temperature and in the presence of the same initiating system as step a); and
   c) recovering, at the end of the polymerization, the block copolymer thus obtained,
   wherein a precipitation and/or recovery step of a first polymeric block is absent between steps a) and b).

2. The process according to claim 1, wherein the $R_3$ group is —$C(CH_3)_2$—CN.

3. The process according to claim 1, wherein the $R_3$ group is —$C(CH_3)_2$—Ph.

4. The process according to claim 1, wherein the $R_3$ group is —$CHCH_3$Ph.

5. The process according to claim 1, wherein the polymerization of both step (a) and step (b) is carried out at a temperature ranging from 120 to 150° C.

6. The process, according to claim 1, wherein the initiator having general formula (I) is present in concentrations ranging from 0.01 to 2% in moles with respect to the total moles of the monomers fed.

7. The process according to claim 1, wherein the generators (G) are selected from the group consisting of dibenzoyl peroxide, dicumyl peroxide, and N,N'-azobis-(diisobutyronitrile); and with molar ratios I/G ranging from 1 to 3.

8. The process according to claim 1, wherein the polymerization of both steps (a) and (b) is carried out batchwise, in continuous or semi-continuous at a temperature higher than 120° C. and at a pressure, which is such as to maintain the monomers in liquid phase.

9. A process for the preparation of a block copolymer by means of radicalic polymerization, which comprises:
   a) polymerizing a vinylaromatic monomer at a temperature higher than, or equal to, 120° C., in the presence of a radicalic initiating system, consisting of a compound having general formula (I):

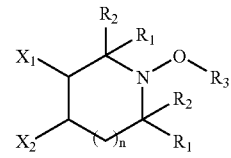

wherein $R_1$ and $R_2$, the same or different, represent a methyl or ethyl radical, $X_1$ represents a hydrogen atom, $X_2$ represents a hydrogen atom or a hydroxyl, or $X_1$ and $X_2$, the same or different, represent a $C_1$-$C_4$ (iso)alkyl radical, or, they jointly form an aromatic ring, n is equal to zero or 1, and $R_3$ represents a radical selected from the group consisting of
   —$C(CH_3)_2$—CN,
   —$C(CH_3)_2$—Ph, and
   —$CHCH_3$Ph;
   or $R_3$ is absent, as in that position there is an un-coupled electron, in a mixture with radical generator compounds (G) selected from the group consisting of peroxides, peresters, percarbonates, and azobisdialkyldinitriles, and with molar ratios I/G lower than 4;
   until a conversion of the monomer ranging from 5 to 99.9% is obtained;
   b) feeding to the polymerization mixture of step (a), after obtaining the desired conversion, a monomer deriving from (meth)acrylic acid in such a quantity that, at the end of the polymerization, the total weight of the block copolymer, Mw, is lower than 1,000,000, wherein step b) is carried out at the same operating temperature and in the presence of the same initiating system as step a); and
   c) recovering, at the end of the polymerization, the block copolymer thus obtained;
   wherein a precipitation and/or recovery step of a first polymeric block is absent between steps a) and b), and at least one of the following conditions is satisfied in reference to formula (I):

the $R_3$ group is —C(CH$_3$)$_2$—CN;

the $R_3$ group is —C(CH$_3$)$_2$—Ph;

the $R_3$ group is —CHCH$_3$Ph;

$X_1$ and $X_2$ jointly form an aromatic ring, and n is equal to zero; and the initiator is selected from the group consisting of 1,1,3,3-tetraethyl-2-(2-cyanoprop-2-yl)-2,3-dihydro-1H-isoindole;

1,1,3,3-tetraethyl-2-(2-phenylprop-2-yl)-2,3-dihydro-1H-isoindole;

1,1,3,3-tetraethyl-2-(2-phenylethyl)-2,3-dihydro-1H-isoindole;

1,1,3,3-tetramethyl-2-(2-cyanoprop-2-yl)-2,3-dihydro-1H-isoindole;

1,1,3,3-tetramethyl-2-(2-phenylprop-2-yl)-2,3-dihydro-1H-isoindole; and 1,1,3,3-tetramethyl-2-(2-phenylethyl)-2,3-dihydro-1H-isoindole.

10. The process according to claim 9, wherein the $R_3$ group is —C(CH$_3$)$_2$—CN.

11. The process according to claim 9, wherein the $R_3$ group is —C(CH$_3$)$_2$—Ph.

12. The process according to claim 9, wherein the $R_3$ group is —CHCH$_3$Ph.

13. The process according to claim 9, wherein in the radicalic initiating system, having general formula (I), $X_1$ and $X_2$ jointly form an aromatic ring, and n is equal to zero.

14. The process according to claim 13, wherein the initiator having general formula (I) is selected from the group consisting of 1,1,3,3-tetraethyl-2-(2-cyanoprop-2-yl)-2,3-dihydro-1H-isoindole;

1,1,3,3-tetraethyl-2-(2-phenylprop-2-yl)-2,3-dihydro-1H-isoindole;

1,1,3,3-tetraethyl-2-(2-phenylethyl)-2,3-dihydro-1H-isoindole;

1,1,3,3-tetramethyl-2-(2-cyanoprop-2-yl)-2,3-dihydro-1H-isoindole;

1,1,3,3-tetramethyl-2-(2-phenylprop-2-yl)-2,3-dihydro-1H-isoindole; and 1,1,3,3-tetramethyl-2-(2-phenylethyl)-2,3-dihydro-1H-isoindole.

15. A process for the preparation of a block copolymer by means of radicalic polymerization, which comprises:

a) polymerizing a vinylaromatic monomer at a temperature higher than, or equal to, 120° C., in the presence of a radicalic initiating system, consisting of a compound having general formula (I):

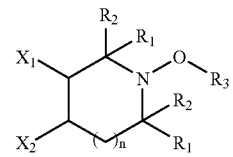

wherein $R_1$ and $R_2$, the same or different, represent a methyl or ethyl radical, $X_1$ and $X_2$ jointly form an aromatic ring, n is equal to zero or 1, and $R_3$ represents a radical selected from the group consisting of

—C(CH$_3$)$_2$—CN,

—C(CH$_3$)$_2$—Ph, and

—CHCH$_3$Ph;

or $R_3$ is absent, as in that position there is an un-coupled electron, in a mixture with radical generator compounds (G) selected from the group consisting of peroxides, peresters, percarbonates, and azobisdialkyldinitriles, and with molar ratios I/G lower than 4;

until a conversion of the monomer ranging from 5 to 99.9% is obtained;

b) feeding to the polymerization mixture of step (a), after obtaining the desired conversion, methacrylonitrile in such a quantity that, at the end of the polymerization, the total weight of the block copolymer, Mw, is lower than 1,000,000, wherein step b) is carried out at the same operating temperature and in the presence of the same initiating system as step a); and c) recovering, at the end of the polymerization, the block copolymer thus obtained, wherein a precipitation and/or recovery step of a first polymeric block is absent between steps a) and b).

16. The process according to claim 15, wherein n is equal to zero.

17. The process according to claim 16, wherein the initiator having general formula (I) is selected from the group consisting of 1,1,3,3-tetraethyl-2-(2-cyanoprop-2-yl)-2,3-dihydro-1H-isoindole;

1,1,3,3-tetraethyl-2-(2-phenylprop-2-yl)-2,3-dihydro-1H-isoindole;

1,1,3,3-tetraethyl-2-(2-phenylethyl)-2,3-dihydro-1H-isoindole;

1,1,3,3-tetramethyl-2-(2-cyanoprop-2-yl)-2,3-dihydro-1H-isoindole;

1,1,3,3-tetramethyl-2-(2-phenylprop-2-yl)-2,3-dihydro-1H-isoindole; and 1,1,3,3-tetramethyl-2-(2-phenylethyl)-2,3-dihydro-1H-isoindole.

* * * * *